Sept. 8, 1953     A. RAPPL     2,651,072
WINDSHIELD CLEANER SYSTEM
Filed Oct. 6, 1948     2 Sheets-Sheet 1
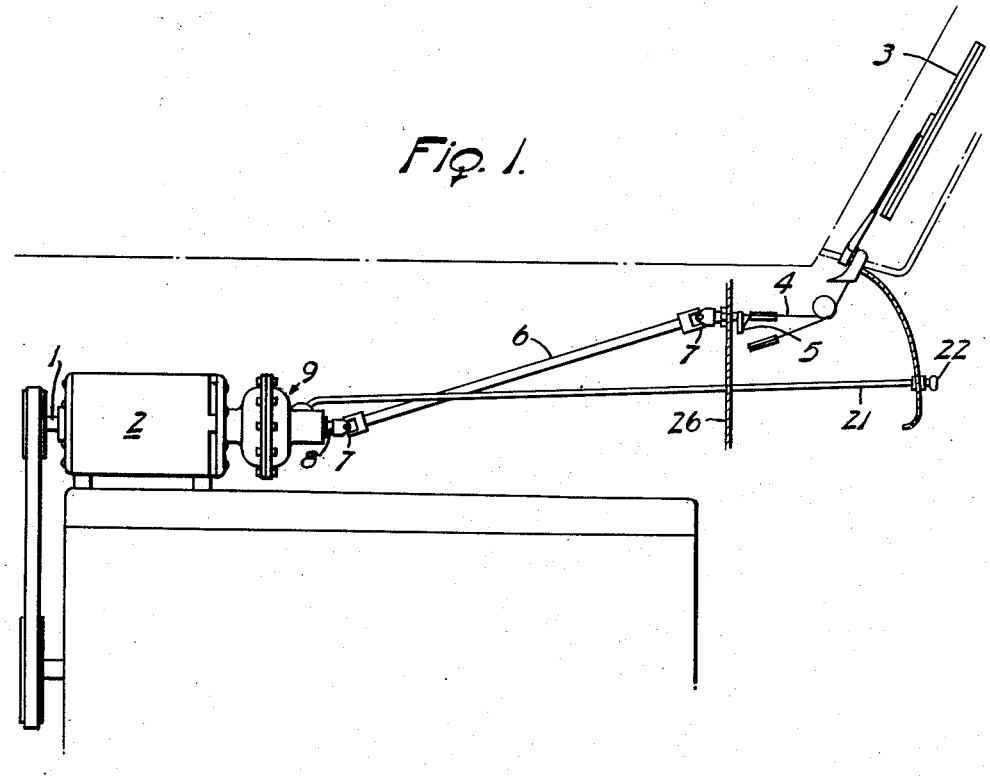
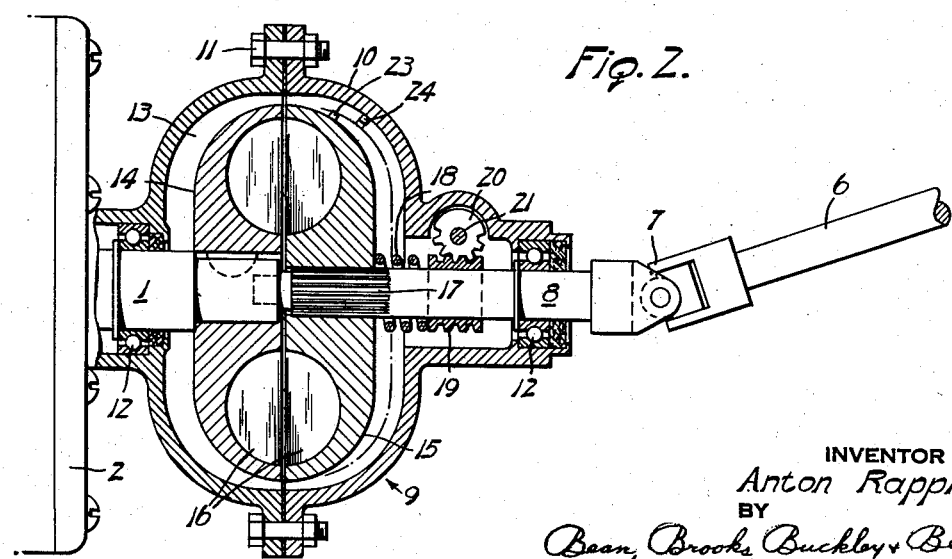
INVENTOR
*Anton Rappl*
BY
*Bean, Brooks, Buckley & Bean*
ATTORNEYS Sept. 8, 1953          A. RAPPL                    2,651,072
                  WINDSHIELD CLEANER SYSTEM
Filed Oct. 6, 1948                          2 Sheets-Sheet 2

INVENTOR
Anton Rappl
BY
Bean, Brooks, Buckley & Bean
ATTORNEYS

Patented Sept. 8, 1953

2,651,072

UNITED STATES PATENT OFFICE 2,651,072

WINDSHIELD CLEANER SYSTEM

Anton Rappl, Eggertsville, N. Y., assignor to Trico Products Corporation, Buffalo, N. Y.

Application October 6, 1948, Serial No. 53,017

5 Claims. (Cl. 15—253)

This invention relates to the windshield cleaning art and especially to the automatic cleaning field in which the wiper is moved back and forth by means of a power drive. It has heretofore been proposed to drive the wiper from the vehicle engine as a source of power but, due to the fact that the engine itself operates at variable speeds, the wiper also reflects this characteristic in its movement and consequently acts excessively fast at times and impractically slow at other times across the field of vision. Furthermore, it has been proposed to couple the wiper to a moving part of the vehicle engine in a manner to enable the wiper being unclutched at the will of the motorist. The clutching arrangements have been a source of practical concern, and the included power transmissions have lacked the flexibility so much desired for maximum efficiency in cleaner operation.

The object of the present invention is to provide a power driven wiper arrangement in which the power transmission embodies a practical degree of flexibility by which a desired operating speed may generally be obtained and the greatest efficiency in wiping operation be derived from the vehicle engine as a source of power.

A further object of the invention resides in a flexibility of power transmission by which the constantly acting but variable source of power is applied to the wiper in a manner to give the wiper a freedom of uniform movement for the practical functioning of the same.

The foregoing and other objects of the invention will manifest themselves as the following description progresses wherein reference is made to the following drawings in which Fig. 1 is a schematic view illustrating the general layout of the windshield cleaning system as installed on a motor vehicle;

Fig. 2 is a fragmentary view of the hydraulic clutch and wiper control arrangement in axial section;

Figure 3:
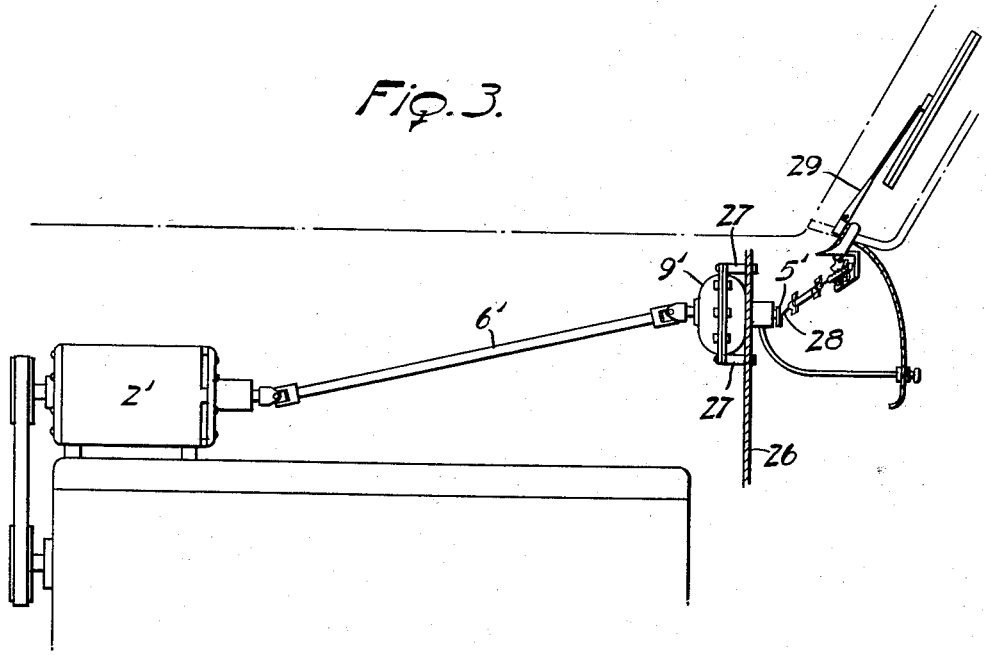
Fig. 3 is a view similar to Fig. 1 but showing a modified installation.
Figure 4:
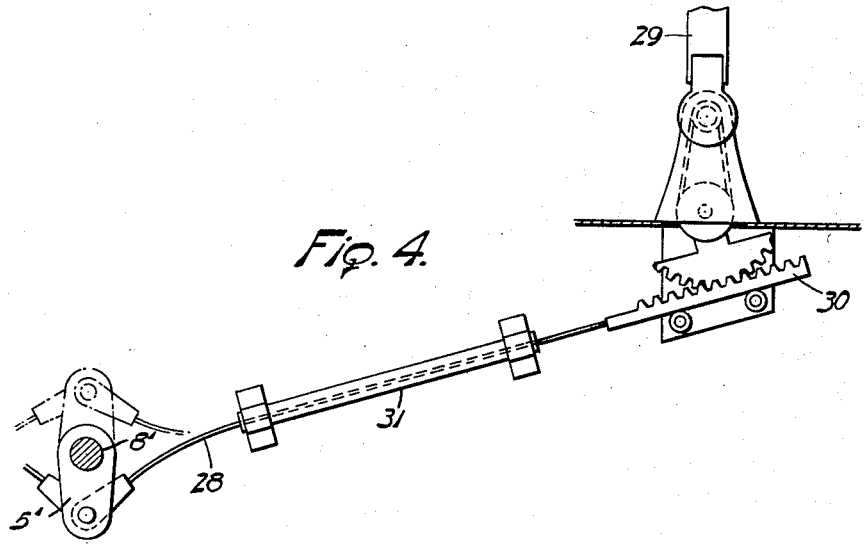
Fig. 4 is a detailed sectional view of such modified embodiment.

Referring more particularly to the drawings, the numeral 1 designates the drive shaft for the windshield cleaner, which shaft may be either a rotating shaft of the engine, or, as shown, another of the vehicle power plant and driven from the engine, such as the generator 2. This power drive shaft for the windshield wiper 3 is connected thereto by a fluid drive or transmission which may include a suitably guided cable 4, a driving crank 5 therefor, a revolving shafting 6 with universal couplings 7, where desired, to facilitate installation, and a driven shaft 8. Interposed in the power line is a hydraulic clutch unit 9 which provides a flexibility in the transmission for admirably adapting the fluctuations in speed of the drive shaft 1 to the wiper for accomplishing the desired wiping action in maintaining the field of vision clear and free of vision-obscuring matter. The hydraulic or fluid clutch may be of any approved type, such as the one herein illustrated, by way of example, which has a housing 10 with its sections secured together by fasteners 11 and formed with journaled bearings 12 for supporting the drive and driven shafts 1 and 8 in alinement. The housing chamber 13 contains a given quantity of a suitable clutch liquid. Fixed on the protruding inner end of the drive shaft 1 is an impeller or clutch member 14 while mounted on the driven shaft 8 is a companion and cooperating clutch member 15, the opposing faces of the two clutch parts being formed with annular series of recesses separated by vanes or blades 16. The action is such that, in addition to the friction between the moving parts, the liquid is impelled by the impeller 14 and, because of the cross sectional shape of the recesses and the disposition of the blades, an annular series of jets of the hydraulic fluid is ejected laterally against the blades of the driven clutch member 15 to impart rotary motion to the latter.

The driven clutch member 15 is slidably mounted on the driven shaft 8, by reason of the spline connection 17, but is normally urged toward the driving clutch part 14 by a spring 18 to normally maintain a given clearance between the two clutch parts. The degree of compression of the spring 18 may be regulated by suitable means, such as the rack sleeve 19 and the pinion 20, the latter being accessible to the motorist through a flexible shaft 21 and knob 22 that enable the pinion to be rotated clockwise or counter-clockwise for sliding the rack sleeve one way or the other upon the driven shaft to effect such regulation of the spring.

Consequently, the adjustable spring serves as a means for determining the maximum speed of rotation of the driven shaft, and the speed of operation of the connected wiper or wipers, by varying the clearance and therefore the amount of fluid slippage between the clutch parts 14 and 15. When the speed of rotation of the driving shaft 1 exceeds a predetermined speed, the driven clutch part 15 will recede against the spring action and enlarge the clearance between the clutch parts to allow greater slippage of the hydraulic fluid. Under these conditions the driving clutch part 14 will rotate at a much faster speed than the driven clutch part 15. As the rotative speed of the drive shaft 1 diminishes, the spring 18 will slide the driven clutch part 15 closer to the driving clutch part and finally restore the normal relationship between the two parts when conditions permit. Should the motorist desire to increase the normal speed of wiper operation, he will move the rack sleeve support for the spring accordingly and thereby increase the spring tension at which the driven clutch part begins to respond. Should he desire to lower the normal speed of wiper operation, a reverse rack sleeve adjustment will be made to lighten the spring action upon the slidably mounted driven clutch part 15.

The hydraulic clutch, in addition to serving as a speed regulator, will also provide a safety factor to prevent injury to the wiper mechanism when the wiper becomes abnormally obstructed in its movement, as by a snow bank formation in the wiper path, in which instance the driven clutch part will yield away from its cooperating clutch part 14. Again, should the wiper become frozen to the windshield, the driven clutch part 15 will recede to increase the slippage of the hydraulic clutch liquid as circulated by the constantly rotating clutch part 14. This safety provision precludes breakage or injury to the cleaner mechanism and insures an automatic restoration to normal relations when the cause of obstruction is removed.

When it is desired to arrest the wiper, the rack sleeve will be adjusted to enable the runner or driven clutch member 15 moving to its extreme right position, shown by the broken line in Fig. 2, wherein maximum slippage of the circulating clutch liquid will occur and the latter will impose no appreciable torque upon the clutch part 15.

If desired, positive means may be provided for holding the driven clutch part fast and against rotation when the wiper is parked, such as a shoulder 23 on the clutch part 15 contacting an arresting abutment 24 on the inner wall of the chamber 13 when such driven clutch part is in the broken line position. This provision will serve to arrest the driven shaft 8 and its connected wiper at a definite point, and the location of the arresting abutment 24 will determine the parked position for the wiper 3.

The hydraulic clutch may be disposed in any suitable location on the vehicle. In Fig. 1 it is shown on or adjacent the source of power, while in Fig. 3 it is arranged adjacent the wiper, as on the fire wall 26 of the vehicle by means of brackets 27. The hydraulic clutch may be similar to that described in the previous embodiment, if desired, with the speed regulating spring being set to a predetermined tension by means of the knob 22'.

The driven shaft 8' has its crank 5' rotating in unison therewith, as do the corresponding parts of the previously described embodiment, and said crank 5' is connected by a push-pull wire 28 and a rack and pinion unit 30 to the wiper actuating arm 29, the push pull wire being suitably guided through a suitable flexible housing 31.

The hydraulic clutch provides a flexibility in the transmitting power to provide an automatic speed control as well as a safety factor to protect the wiper mechanism against injury, and while the foregoing description has been given in detail it is without thought of limitation since the inventive principles involved are capable of assuming other physical embodiments without departing from the spirit of the invention and the scope of the appended claims.

What is claimed is:

1. A windshield cleaner comprising a wiper, a rotary shaft for operating the same, and a hydraulic clutch operatively connecting the shaft to the wiper and including a liquid holding chamber with cooperating and opposed driving and driven clutch members coaxially arranged in the chamber, one of said members being mounted for axial movement away from the cooperating member, and manual means for axially adjusting said movable member whereby to regulate the wiper speed.

2. A windshield cleaner comprising a wiper, a rotary shaft for operating the same, and a hydraulic clutch operatively connecting the shaft to the wiper and including a liquid holding chamber with cooperating and opposed driving and driven clutch members coaxially arranged in the chamber, one of said members being mounted for axial movement away from the cooperating member, manual means for axially adjusting said movable member whereby to regulate the wiper speed, and resilient means yieldably holding the two clutch members in their operative relationship while permitting separation of the two members when an abnormal load is imposed upon the wiper.

3. A windshield cleaner comprising a wiper, a driven shaft operatively connected thereto for moving the wiper back and forth, a drive shaft, and a hydraulic clutch operatively connecting the two shafts and including an impeller angularly fixed on each shaft and operating within an enclosing chamber containing a power transmitting liquid, the two impellers being spaced one from the other in coaxial opposition to enable relative angular movement therebetween, and means to positively arrest the driven impeller at a given angular position.

4. A windshield cleaner comprising a wiper, a driven shaft operatively connected thereto for moving the wiper back and forth, a drive shaft, a hydraulic clutch operatively connecting the two shafts and including an impeller fixed on each shaft and operating within an enclosing chamber containing a power transmitting liquid, the two impellers being spaced one from the other in coaxial opposition to enable relative angular movement therebetween, means for varying the space between the impellers for changing the effectiveness of the power transmission of the liquid and thereby controlling the speed of wiper operation and means for positively holding the wiper in an arrested position, said holding means comprising a lug fixed on the wall of said chamber and a cooperating second lug fixed to the driven impeller, said speed controlling means acting to render the holding means operative.

5. A windshield cleaner comprising a wiper, a rotary shaft for operating the same, and a hydraulic clutch operatively connecting the shaft to the wiper and including a liquid holding chamber with cooperating and opposed driving and driven clutch members coaxially arranged in the chamber, one of said members being mounted for axial movement away from the cooperating member, manual means for axially adjusting said movable member whereby to regulate the wiper speed, and means for positively holding the wiper in an arrested position, said holding means being engageable by said axially movable member when withdrawn from the cooperating member by said manual means.

ANTON RAPPL.

References Cited in the file of this patent

UNITED STATES PATENTS

| Number | Name | Date |
| --- | --- | --- |
| 1,553,621 | Locklin | Sept. 15, 1925 |
| 1,831,770 | Sinclair | Nov. 10, 1931 |
| 2,073,357 | Wemp | Mar. 9, 1937 |
| 2,243,016 | Prichard | May 20, 1941 |
| 2,336,167 | Dillon | Dec. 7, 1943 |
| 2,447,130 | Matulaitis | Aug. 17, 1948 |